United States Patent [19]
Emory

[11] E Patent Number: Re. 32,067
[45] Reissued Date of Patent: Jan. 21, 1986

[54] UNIVERSAL LAWN SPREADER ATTACHMENT FOR LAWN MOWERS

[76] Inventor: Edward P. Emory, P.O. Box 5907, Lake Charles, La. 70606

[21] Appl. No.: 428,531

[22] Filed: Sep. 30, 1982

Related U.S. Patent Documents

Reissue of:
[64] Patent No.: 4,327,541
Issued: May 4, 1982
Appl. No.: 120,928
Filed: Feb. 12, 1980

[51] Int. Cl.[4] ..... A01D 19/00
[52] U.S. Cl. ..... 56/16.8; 16/113; 16/111 A; 56/DIG. 5; 56/DIG. 18; 111/1; 180/53 WA; 188/29; 222/610
[58] Field of Search ..... 111/1, 8-14, 111/82; 29/281.1, 282; 188/29; 410/35, 42, 47-50; 56/16.8, DIG. 5, DIG. 18; 16/111, 111 A, 112, 113; 180/53 WA, 198; 193/9; 222/610, 623-625; 211/60 R; 172/245, 250, 253; 239/498, 521-523; 280/47; 24/73 R, 73 C, 73 SA, 81 A, 81 BA, 84, 115 H, 230.5, 249 R, 183, 230.5 R

[56] References Cited

U.S. PATENT DOCUMENTS

| | | | |
|---|---|---|---|
| 1,033,038 | 7/1912 | Saybolt | 239/521 |
| 1,692,185 | 11/1928 | Paine et al. | 56/DIG. 18 |
| 1,876,409 | 9/1932 | Gordon | 56/DIG. 5 |
| 2,589,425 | 3/1952 | Newman et al. | 111/82 |
| 2,792,970 | 5/1957 | Gaiman | 56/DIG. 5 |
| 2,795,832 | 6/1957 | Zinke | 24/230.5 R |
| 2,831,556 | 4/1958 | Thoman et al. | 193/9 |
| 2,849,027 | 8/1958 | Tetyak | 410/42 X |
| 2,861,527 | 11/1958 | Phillips | 193/9 X |
| 2,990,186 | 6/1961 | Gandrud | 111/10 X |
| 3,477,212 | 11/1969 | Coffman | 56/DIG. 5 |
| 3,534,533 | 10/1970 | Luoma | 56/DIG. 5 |
| 4,099,617 | 7/1978 | Nist | 410/35 |

FOREIGN PATENT DOCUMENTS

| | | | |
|---|---|---|---|
| 462588 | 1/1914 | France | 29/282 |

*Primary Examiner*—James R. Feyrer
*Attorney, Agent, or Firm*—C. Emmett Pugh & Associates

[57] ABSTRACT

A universal spreader comprising a hopper; a cable by which the speading of fertilizer/chemical/seed/pesticide/etc., in the hopper may be initiated or terminated; a rotatable, driven agitator which distributes and controls the amount of the fertilizer; an adjustable width drive for the agitator; a series of moveable fertilizer delivery tubes or "fingers" for delivering the fertilizer from the hopper to the ground which allows spreader to be fit on lawnmowers of most sizes with handles of different and varied configurations; and a guide securing device which also assists in spreading the fertilizer from the "fingers" while also serving to provide a base for anchoring and adjusting the width of the "fingers" to coincide with the swath of the lawn cut by the blades of the mower. Two additional, accessory devices include handle lock to prevent forward and rearward motion of the lawnmower handle and a temporary, wheel contacting, mounting tool to assist the user in mounting and attaching the hopper unto the lawnmower in a one man operation.

12 Claims, 11 Drawing Figures

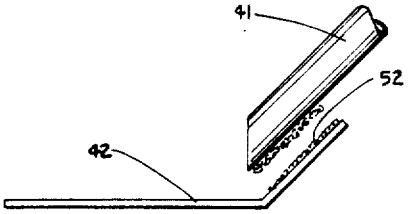
FIG. 4A.
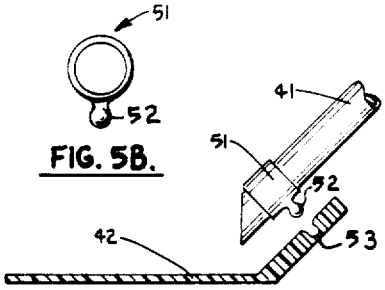
FIG. 5B.
FIG. 5A.
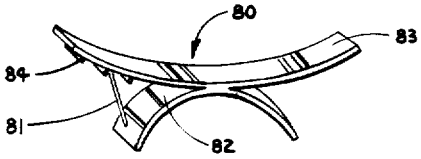
FIG. 8.
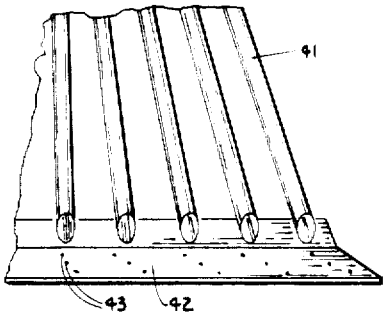
FIG. 4.
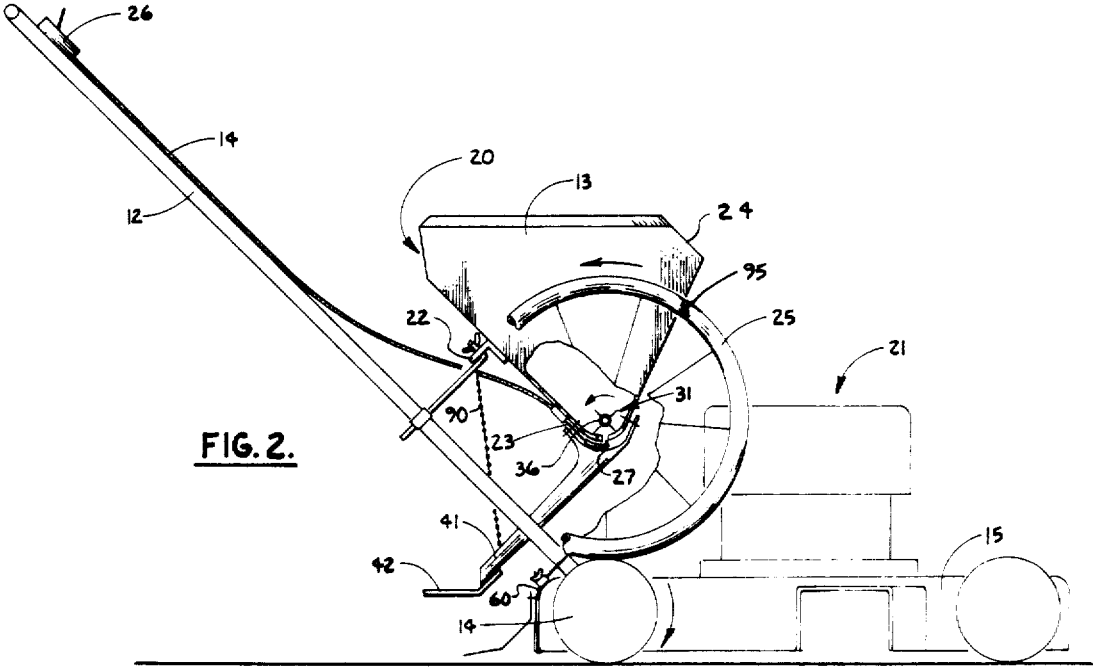
FIG. 2.

UNIVERSAL LAWN SPREADER ATTACHMENT FOR LAWN MOWERS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a universal fertilizer (or other material) spreader which may be attached to any type of lawnmower, be it self-propelled or not and also allows for removal/reinstallation on same or other types or sizes of lawnmowers as deemed useful. The system of the invention also includes two separate devices, a handle lock, which locks the handle in position and prevents accidental spillage of the fertilizer during operation, and a mounting tool provided to assist the user in mounting and attaching the hopper unto the lawnmower.

2. Prior Art

In the past, prior attempts at fertilizer/chemical/seed spreaders have primarily been confided to two entirely separate types of devices. One type, in which mowing and fertilizing are achieved as two separate tasks, requiring a separate spreader and mower, is essentially a repetitive, time consuming process in which the operations must be performed as two separate steps and not simultaneously. The other type (such as P. G. Redman, U.S. Pat. No. 3,100,371), an add on type, has primarily dealt with integration of the spreader with the lawnmower, in that the fertilizer is fed through the blade housing and distributed primarily by the action of the lawnmower blade while turning. This type affords two primary disadvantages:

(1) the spreader becomes permanently attached to and is part of the lawnmower; and (2) allows for contact between the fertilizer/chemicals and the mower and/or rotary blade assembly, thereby allowing corrosive/chemical reactions on the lawnmower itself to take place. This leads to possible early failure of the lawnmower and/or the blade assembly. It is also highly doubtful that the action of the blades in this type of device is sufficient in obtaining adequate spreading of the fertilizer.

Other attempts (A. P. Vicendese et al. U.S. Pat. No. 3,942,308) have been to combine the lawnmower and spreader into one entity, but these suffer the disadvantages in that the spreader assembly is integrated with the lawnmower itself and cannot be removed and attached to another lawnmower.

One attempt at a spreader (A. G. Troka, et al., U.S. Pat. No. 3,102,375) which is detachable has three shortcomings:

(1) it is not readily adaptable to lawnmowers of different widths;

(2) has a fixed spread width; and (3) is located rearwards of the rear wheel, thereby moving the center of gravity farther back, so that upon filing of the hopper, possible tilting of the lawnmower will take place with corresponding spillage of the contents of the hopper being possible.

Other attempts at removable spreaders have relied on the vibration and swinging movements of the handle to provide for spreading of the contents. This type of system has obvious flaws in that the spread of the fertilizer is very erratic and uneven, and little control over the fertilizing process is possible.

In R. N. Kelly's spreader (U.S. Pat. No. 2,639,571) control of spreading is achieved by the blades of a rotary blade lawnmower periodically engaging an arm, which in turn swings a door open while moving agitator pins back and forth, to achieve spreading of the contents. The disadvantages of this type of spreader are:

(1) operable only with rotary blade lawnmowers;

(2) has a fixed width of spread of fertilizer;

(3) has a complicated mechanical device which would be prone to failure; and (4) moves the center of gravity farther backwards which makes possible spilling of the contents.

The shortcomings of the prior art show the need for a spreader which is universally adaptable for use for example with push or powered mowers of the non-rider type. The system should also provide for adjustment of fertilizer spread width and should be adaptable to all width mowing machines. The system should also allow for control of the rate at which fertilizer is spread and allow for no contact between the fertilizer and the lawnmower to prevent corrosive/chemical attack of the lawnmower. Also the system should not substantially alter the center of balance of the lawnmower in a negative fashion and both provide for moving the spreader to other lawnmowers and allow for fertilizing to take place without the lawnmower being on. It is an aim of the present invention to fill all the shortcomings of the prior art and to meet the conditions as set forth in the above.

Prior U.S. patents which may be of interest are listed below:

| Patentee(s) | U.S. Pat. No. | Issue Date |
|---|---|---|
| Alexander Konrad | 3,097,467 | July 16, 1963 |
| C. W. Anderson | 3,359,710 | Dec. 26, 1967 |
| L. Coffman | 3,477,212 | Nov. 11, 1969 |
| A. P. Vicendese, et al | 3,942,308 | Mar. 9, 1976 |
| P. C. Redman | 3,100,371 | 1963 |
| H. McCain | 3,332,221 | |
| R. N. Kelly | 2,639,571 | May 26, 1953 |
| C. F. McBride | 2,974,963 | Mar. 14, 1961 |
| A. G. Troka, et al | 3,102,375 | Sep. 3, 1963 |
| V. H. Peoples | Re 24,189 | July 31, 1956 |

The Peoples patent is directed to an independent spreader, while the other patents show variations of some form of spreader or dispenser associated with a lawnmower.

BRIEF DESCRIPTION OF THE DRAWINGS

For a further understanding of the nature and objects of the present invention reference should be made to the following detailed description, taken in conjunction with the accompanying drawings, in which like parts are given like reference numerals and wherein:

FIG. 2 is a side view, partially cut-away, in which a sectional view of the agitator, its driving mechanism, the "fingers", and splash plate of the spreader as attached to the lawnmower of FIG. 1 is seen.

FIG. 4 is a partial, close-up view of the lower portions of the transfer funnel "fingers" and splash plate with its associated positioning markers.

FIG. 4A is a side, partial, close-up view of one of the transfer funnel "finger", the splash plate, and a "Velcro" fastening system for joining the splash plate to the "fingers" of FIG. 4.

FIG. 5A is a side, partial, close-up view of one of the transfer funnel "fingers", the splash plate, and an alternate snap ring fastening system for joining the splash plate to the fingers; while FIG. 5B is an end, close-up of the snap ring element for each "finger" for the fastening system of FIG. 5A.

FIG. 8 is a perspective, top view of the wheel mount tool used as a mounting accessory in the system of the present invention.

SUMMARY DISCUSSION OF INVENTION

The present invention, as embodied, provides a spreader in which adjustment of the fertilizer spread width, as well as adaptable means for mounting on all widths of mowing machines is achieved. The invention allows for control of the rate at which fertilizer is spread and allows for no contact to take place between the fertilizer and the lawnmower in order to prevent any corrosive or chemical attack on the lawnmower and blade assembly. Also, the spreader of the preferred embodiment of the invention does not substantially alter the center of balance of the lawnmower in a negative manner and provides for moving of the spreader to other lawnmowers as well as allowing for fertilization to take place without the lawnmower being on. In using the term "fertilizer" (and its variants herein, such term includes any dispensible lawn care product, such as for example seeds, pesticides, and other chemicals, not only the usual lawn fertilizers.

It is a definite advantage to combine mowing operations with fertilization, resulting in economics of both time and, when applicable, money. It is also desirable that the device which performs the spreading be universal in nature, adaptable to all lawnmower widths, controllable as to fertilization rate while maintaining uniformity of spread, and maintain separation of the fertilizer from the lawnmower, including also the blades, in order that undesirable corrosive/chemical reaction of the lawnmower and its associated parts will not take place. It is further a desired aim that the invention, hereafter described, have as a primary goal the integration of such features into its design.

These and other advantages of the invention will become more clear from the detailed description of the preferred embodiments to follow.

DETAILED DESCRIPTION OF THE PREFERRED EMBODIMENTS

Figure 1:
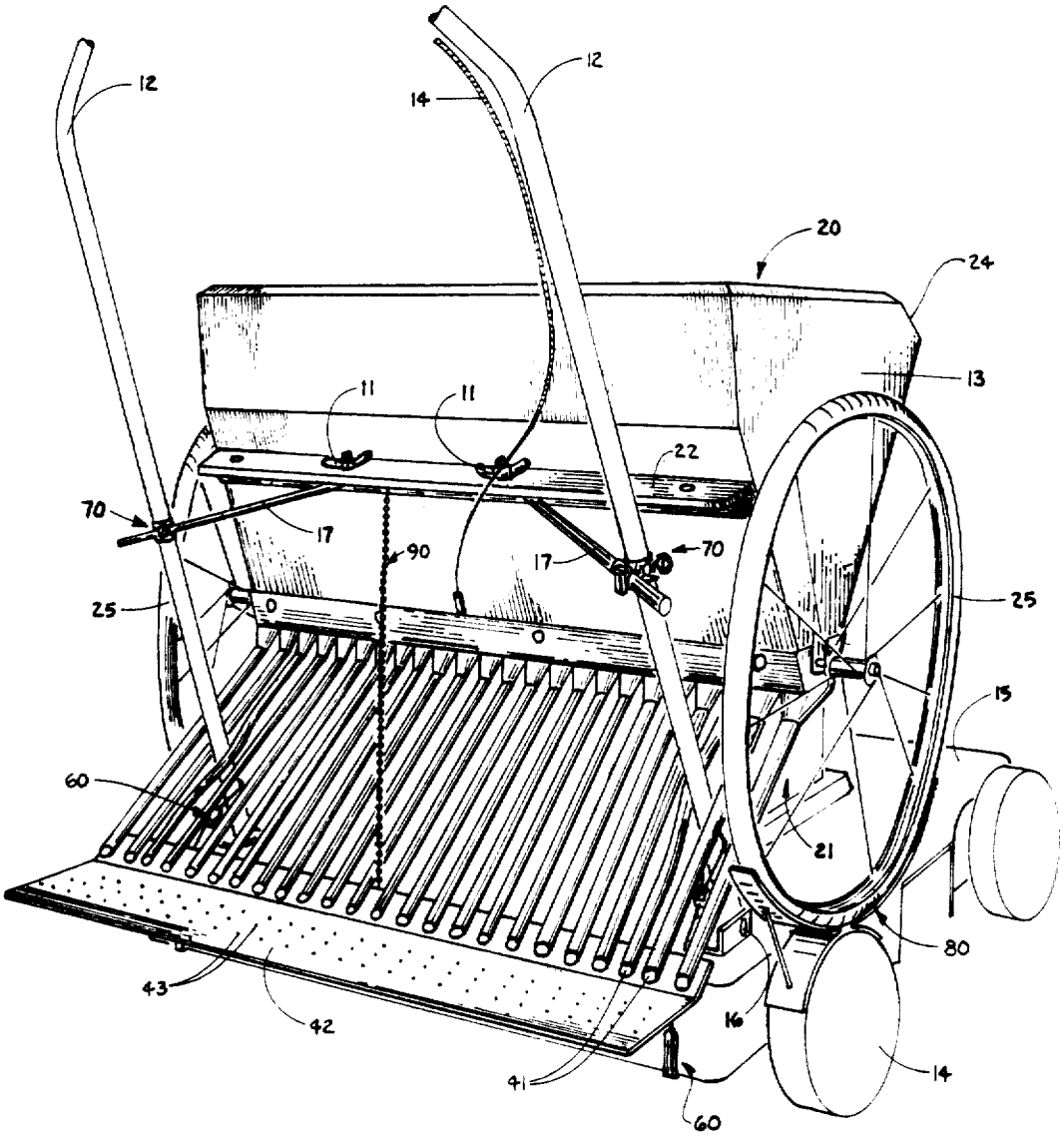
FIG. 1 is an overall, rear, perspective view of the preferred embodiment of the spreader attachment of the present invention mounted on an exemplary lawnmower.

In FIG. 1 a preferred embodiment of the spreader 20 of the present invention can be seen as it is mounted on an exemplary lawnmower 21. In this view, the spreader 20 is seen mounted via handle clamps 70 (seen in closeup in FIGS. 7 and 7A) which are attached to the spreader 20 by means of wingnuts 11, for example, and which extend through holes on support arm connector bar 22. A series of holes on the support bar 22 provide for adjustable widths in order to accommodate mounting on lawnmowers of different width handlebars and different width wheel bases 12. The angle iron connector bar 22 is securely affixed to the hopper 13 by riveting or welding or such other means as desired. A control cable 14 is used to control the opening and closing of the sliding door or shutter 23 (see FIG. 2) in order that fertilization may be obtained as desired.

The drive wheel 25 (see FIG. 2) for the hopper 13 is driven by the rotating mower wheel 14 as the mower is pushed, or mechanically driven, across the ground, and the drive wheel 25 in turn drives a flow control system or agitator system 31 for the fertilizer (as explained more fully hereinafter). The rate at which the lawnmower is driven or pushed in combination with the sliding door 23, thereby results in controlling the rate at which the fertilizer is delivered.

As the drive wheel 25 turns, fertilizer in the hopper 13 is delivered down to the transfer funnel, distribution "fingers" 41, at a controlled rate, and is in turn delivered further down to the splash plate 42, which assists in maintaining an even spread of fertilizer across the width, as so desired, of ground as traversed by the mower.

Also seen in FIG. 1 is the handle lock assembly 60 (seen in close-up in FIG. 6), which prevents any forward, upward movement of the handle 12 in relationship to the mower body 15. By this means the normal pivoting of the handle on pins 16 is prevented and accidentalspillage of the contents of hopper 13 is prevented.

In FIG. 2 a side view of the spreader 20 as attached to the lawnmower 21 is seen. In this view, a sectional view of the drive wheel 25 and agitator assembly 31 is seen. Also shown is an angular cut section 24 on the hopper 13 which prevents the hopper 13 from blocking the normal line of sight and allows for easy viewing of the mowing operation by the operator, in particular one who is relatively short.

As lawnmower 21 is pushed or driven mechanically across the ground, rear wheels 14 rotate, and be being in frictional contact with the drive wheels 25, drive wheels 25 are caused to turn also. As the drive wheels 25 turn, rotational motion is transfered by means of an axial shaft 32 (note FIG. 3) to the adjustable width, agitator axle assembly 31. As the agitator axle assembly 31 turns, fertilizer is distributed by means of the hopper agitator 36 to the distribution "fingers" or tubes 41 at a controlled rate. The rate is further controlled by use of control cable 14 and sliding door 23. When the lever 26 is to the rear, a maximum flow rate will be established as sliding door 23 completely uncovers opening 27; and, when the lever 26 is fully forward, no dispensing of the contents of the hopper will take place. At positions of lever 26 between these two points, the size of the opening 27 is effectively controlled. This, in combination with the angular velocity at which the agitator is turning, controls the fertilizer flow rate emitting from opening 27 and entering the "fingers" 41.

From this point, the fertilizer travels down through the "fingers" 41 and is spread out by the splash plate 42 and evenly distributed to the ground.

Figure 3:
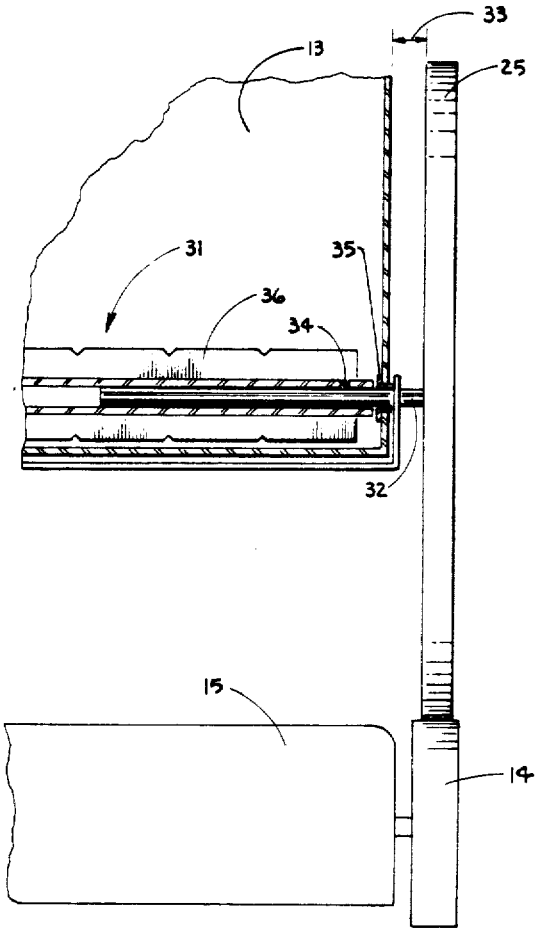
FIG. 3 is a cross-sectional, close-up, partial view of the adjustable width, agitator mechanism and its associated drive wheels as mounted on the mower.

In FIG. 3 a detailed view of the agitator assembly 31, including agitator body 36, axial shaft 32, and drive wheel 25, is seen as they are connected through the wall of the hopper 13. Axial shaft 32 is able to laterally vary its exposed length 33 back and forth by being moveable in and out with respect to the agitator body 36 but then lockable in the lateral position desired by means of a set screw 34 or the other type of temporary fastener. This allows for the selective mating of the drive wheels 25 with the rear wheels 14 of the lawnmower regardless of their lateral spacing and allows for the adaptation of the spreader to lawnmowers of different widths.

The set screw 34 also serves to transmit the rotational motion of wheel 25 to the agitator body 36. As drive wheel 25 is caused to turn by rear wheel 14, axial shaft 32 which is affixed to drive wheel 25 at its end is caused to rotate also. This rotational motion is transferred along the shaft 32 and is transmitted to the agitator body 36 by means of set screw 34 which prevents axial shaft 32 from turning in the axle assembly 31, resulting in the rotation of drive wheel 25, shaft 32, and agitator/axle assembly 31 as one, integral unit.

Bushing 35, as is known to those skilled in the art, serves both to provide bearings, which provide a fixed turning point for shaft 32, while preventing the contents of the hopper 13 from entering the bearing area, thereby preventing both loss of hopper contents and damage to the bearing area and the surface of the shaft 32.

As agitator/axle assembly 31 turns, agitator vanes or body 36 stir the contents of the hopper 13 and assist in distributing the contents of the hopper 13 at a controlled rate through opening 27 (see FIG. 2).

In FIG. 4 a close-up view of the lower ends of "fingers" 41 and their attachment to the splash plate 42 can be seen. In a first embodiment (note FIG. 4A) the "fingers" 41 are attached to the splash plate 42 by means of fastenings such as "Velcro" 52, as illustrated, wherein the hook material of the "Velcro" material is fixedly attached to one of the parts (for example the "finger" tubes 41), while the loop material is fixedly attached to the other part (for example the splash plate 42). As is well known, such a "Velcro" type fastening system allows for temporary fastening of the parts which can be easily made, undone and altered, when and as desired. Alternatively, some other temporary fastening system, such as for example appropriate configured clamps or snap connections such as the preferred circular snap ring 51, as seen in FIGS. 5A and 5B, could be used with the tubular "fingers" 41. In this alternate embodiment, the snap ring 51 is carried by the "finger" 41 and has a bulbous projection 52 on its underside which mates with an indentation, hole or enlarged area 53 in the splash plate 42 where the two are snaped together and held compressing, frictional engagement.

The splash plate 42, as can be seen in FIG. 4, has a series of positioning marks 43 on the surface of the plate which guide the user in positioning the ends of the "fingers" 41 and their lateral, end spacing to allow for varying the width of the spread of fertilizer to coincide with that of the lawnmower, or as so desired. Although not illustrated, the "Velcro" material and the indentations (or other fastening means used) are included at least at various alternate spots along the lateral width of splash plate 42 to allow for the lateral positioning of the ends of the "fingers" 41 as desired. Splash plate 42 also serves to assist in evenly distributing the fertilizer as it emerges from the "fingers" 41 so that an even spread may be obtained. Additionally the plate 42 serves to anchor and hold the "fingers" 41 in position. For further support of the splash plate 41 a beaded, adjustable length support chain 90 can be included as illustrated (note FIGS. 1 and 2) for suspending support of the splash plate 42 and its attached "fingers" 42 from the cross-bar 22.

The use of "fingers" or separate, laterally spaced channels for distributing the fertilizer from the hopper 13 down past the mower handles 12 is very important because they are laterally flexible to a sufficient extent and can have their terminal end spacings easily varied. This allows for easy adaptation of the spreader to lawnmowers having different handle locations and different lateral positioning or widths of the handles. Thus, the distribution "fingers" 41 can straddle the handles 12 (or other fixed items on the lawnmower) where necessary (as illustrated) or be contained totally between the mower handle sections where the mower handle has a relatively wide stance. Thus the "fingers" 41 should have a certain degree of lateral flex or flexibility or at least their mounting on the funnel at the hopper bottom should have some lateral give or movement.

Figure 6:
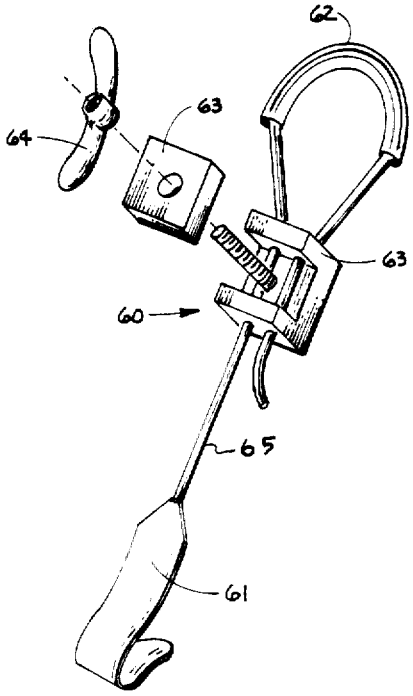
FIG. 6 is a perspective view, partially exploded, of an exemplary handle locking accessory used in the system of the present invention when the lawnmower has a pivoting handle.

In FIG. 6 the handle lock assembly 60 is seen in detail. Mower chassis hook 61, which forms a reverse clip of "U" shaped configuration, is attached to and engages the sides of the bottom, rear, downturned lip of the housing of the lawnmower 21, and handle yoke 62 is placed around the handle 12 of the lawnmower. Cable lock 63 (two parts) and thumb screw 64 are used to lock the handle 12 in position so that the contents of the hopper 13 will not be accidently spilled by movement of the mower handle. The handle lock 60 is made up of an elongated flexible line 65 (for example a steel cable) which extends from the hook clip 61 and looped back around to form the yoke 62. The effective length of the cable 65 can be varied as desired by altering the amount of the cable in the yoke when the handle lock 60 is not in its operative locked disposition as shown in FIGS. 1 and 2, but is otherwise inextendible in length when so in use.

Figure 7:
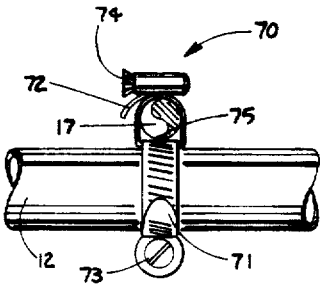
FIG. 7 and FIG. 7A are partial, cross-sectional views of the handle clamp, taken with the handles of 90 degrees to each other, which attach the spreader of FIG. 1 to the mower.
Figure 7A:
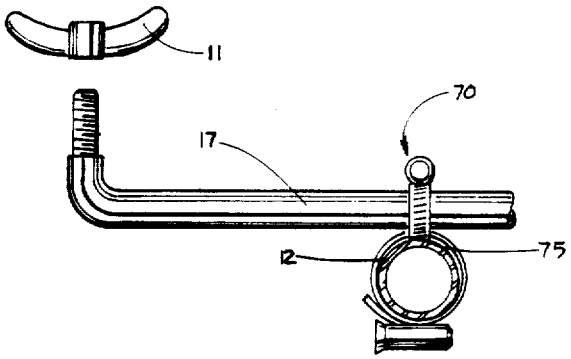

In FIGS. 7 and 7A a simple type of handle clamp 70 is seen in detail. In this type of clamp, use is made of clamps 71 and 72 that are similar to hose clamps in that they adjust their sizes by means of screws 73 and 74, respectively, to enclose different handle diameters. Screws 73 and 74 are also used to lighten the clamps 71 and 72 about the mower handle 12 and hopper support arm 17. Pivotal rivet 75 allows for proper angular placement of the clamps 71 and 72 as the spreader 20 is mounted on the lawnmower 21. The clamp assembly 70 allows for selective positioning of the spreader 20 on the mower 21 for both control of the center of balance, thereby assisting in preventing tipping of the entire mechanism 20 and 21 due to transfer of the center of gravity (that is, maintains the center of balance between the front and rear wheels of the mower) and positioning of the spreader 20 so that the drive wheels 25 are in direct frictional contact with the rear wheels 14 of the mower 21.

In FIG. 8 a view of the accessory mounting tool 80, two of which allow for easy, one man installation of the spreader 20 on the lawnmower 21, is seen. Each tool 80 includes a semi-circular, rigid, fixed upper section 83 and a flexible, semi-circular lower section 82 with an attached brace 81, with the two sections 82, 83 attached together back-to-back. Prior to installation of spreader 20, the two wheel mount tools 80 are placed in position on the rear lawnmower wheels 14, and braces 81 are adjusted against appropriately selected stops 84 to assist the load support of the hopper weight, which in the embodiment illustrated has a center of gravity a little bit to the rear of the axis of the rear lawnmower wheels 14. The flexible, bottom wheel mount section 82 will make full surface, facing contact with the tire of the lawnmower wheel 14, maintaining the positioning of the wheel mount tool 80. Spreader assembly 20, with its drive wheels 25 locked by means of lateral slide bolts 95 slidably attached to the front of the hopper 31 engaging the wheels 25, may now be easily placed into position with each drive wheel 25 placed in its respective upper wheel mount section 83 which engages it in face-to-face contact. As such, each wheel mount tool 80 serves to maintain its drive wheel 25 in proper alignment with its lawnmower wheel 14, and the two tools 80 together temporarily supports the hopper 13 through the drive wheels 25 until the spreader assembly 20 has been finally mounted and finally connected in position on the lawnmower. After final connection of the spreader 20 has taken place, removal of the two wheel mount tools 80 and disengagement of the bolts 95 will allow for the drive wheels 25 to directly contact and rotate with their respective lawnmower wheels 14 in a frictional manner so that turning of the wheels 14 will cause the drive wheels 25 to rotate also. In FIG. 1, one of the wheel mount tools 80 can be seen in position between the two wheels 14 and 25 prior to removal and the subsequent operation of the lawnmower and the spreader 20.

As can best be seen in FIG. 2, the hopper 13 has an inverted, generally triangular configuration in side view and is located directly above the rear wheels 14 of the lawnmower 21, above and in front of the handle 12, with the "fingers" 41 rearwardly extending from the bottom area of the hopper 13 back down past the handle 12 generally adjacent to ground level past the rear end of the lawnmower body or housing, resulting in the fertilizer being spread on the ground completely behind the lawnmower. Additionally, the only structural support and structural connection between the hopper 13 and the lawnmower 21 is via the two drive wheels 25 resting on the rear wheels 14 and the connecting arms 17 extending back from the rear of the hopper 13 to the handle 12 of course the flexible control cable 14 does not constitute a structural support or structural connection member in that it carries no significant load or weight. This placement, which puts the great bulk of the relatively heavy load of the hopper, its contents, and associated distribution system on the drive wheels 25, results in a good, reliable, frictional driving engagement with the rear wheels 14 and an over-all well balanced combined lawnmower and spreader attachment, with universal attachments to most size lawnmowers and with all fertilizer distribution occuring away and separate from and behind the lawnmower.

Because many varying and different embodiments may be made within the scope of the inventive concept herein taught, and because many modifications may be made in the embodiment herein detailed in accordance with the descriptive requirements of the law, it is to be understood that the details herein are to be interpreted as illustrative and not in a limiting sense.

What is claimed is:

1. A spreader attachment, for wheeled lawnmowers with a rearwardly extending handle for manipulation of the lawnmower by the user, for dispensing fertilizer and the like on the ground in association with the lawnmower, comprising:

hopper means, including associated flow control means for controlling the flow of fertilizer from said hopper means to the ground, for mounting on top of the lawnmower in front of and above the lawnmower handle and for holding the fertilizer prior to dispensing the fertilizer to the ground;

mounting connector means attachable to said hopper means for mounting said hopper means on and connecting it to the lawnmower for transport across the ground in association with the lawnmower;

drive wheel means connected to said flow control means for engaging at least one wheel of the lawnmower as a source of motive power and for rotationally driving said flow control means in response to the movement of the engaged lawnmower wheel;

fertilizer distribution means connectable to said hopper means for extending down from said hopper means at the back of the lawnmower and at least in part in the central, back area of the lawnmower down to an area adjacent the ground level and behind the lawnmower housing; and separate handle locking accessory means for locking the lawnmower handle in position with respect to the rest of the lawnmower, the lawnmower including a handle which is pivoted at its lower end for upward, forward movement and a housing having a rear, downturned, lower lip, said handle lock means comprising an elongated member connectable between the handle of the lawnmower and the lower, rear lip of the lawnmower housing, said elongated member being inextendible when said handle lock means is in operative disposition on the lawnmower between the handle and the lower, rear lip of the lawnmower housing preventing any upward, forward movement of the handle.

2. A spreader attachment, for wheeled lawnmowers with a rearwardly extending handle for manipulation of the lawnmower by the user, for dispensing fertilizer and the like on the ground in association with the lawnmower comprising:

hopper means, including associated flow control means for controlling the flow of fertilizer from said hopper means to the ground, for mounting on top of the lawnmower in front of and above the lawnmower handle and for holding the fertilizer prior to dispensing the fertilizer to the ground;

mounting connector means attachable to said hopper means for mounting said hopper means on and connecting it to the lawnmower for transport across the ground in association with thelawnmower;

drive wheel means connected to said flow control means for engaging at least one wheel of the lawnmower as a source of motive power and for rotationally driving said flow control means in response to the movement of the engaged lawnmower wheel; and fertilizer distribution means connectable to said hopper means for extending down from said hopper means at the back of the lawnmower and at least in part in the central, back area of the lawnmower down to an area adjacent the ground level and behind the lawnmower housing, said fertilizer distribution means comprising a plurality of laterally spaced, discrete, separate, downwardly extending channel means, at least the side end ones of which are flexible but capable of being self-supporting in their rigidity, for extending down, at least in the area of the lawnmower where the lawnmower handle extends and adjacent to the lawnmower housing, for distributing the fertilizer from the hopper to the ground through the spaced channel means, said channel means comprising separate, straight, flexible but capable of being self-supporting, elongated tubes disposed down and rearwardly in at least general parallal array; and laterally extending, elongated [splash] *attachment* element means connected to and extending laterally across the bottom end portions of said tubes for [further] *the positioning of said tubes for* distributing the fertilizer from the ends of said tubes out to the ground and for holding said tubes in position at their lower ends.

3. The spreader attachment of claim 2, wherein the flexible, side end ones of said plurality of channel means straddle the lawnmower handle, at least one each of said channel means being located outboard of the lawnmower handle.

4. The spreader attachment of claim 3, wherein said distribution means further comprises a series of said discrete, laterally separate and spaced channels disposed across at least most of the lateral extent of said hopper means, with each channel extending from an area at least adjacent the bottom of said hopper means down to and adjacent the ground level.

5. The spreader attachment of claim 2, wherein the connection between said [splash] *attachment* element means and said tubes comprises a snap fastening system in which a bulbous projection on one part is removeably fastened into an indentation on the other part.

6. The spreader attachment of claim 2, wherein the connection between said [splash] *attachment* element means and said tubes comprises a "Velcro" type system in which the hooks on one part are removably fastened into the loops on the other part.

7. The spreader attachment of claim 2, wherein said drive wheel means includes axial adjustment means connected to said flow control means for varying the lateral position of said drive wheel means for different lawnmower wheel placements on different lawnmowers, said axial adjustment means comprising an axle which is laterally moveable in and out but lockable in its desired position.

8. The spreader attachment of claim 2, wherein said drive wheel means comprises two, rotatable, drive wheels located on opposite sides of said hopper means and mountable over and in contact with one set of lawnmower wheels, and wherein said mounting connector means comprises handle connectors extendable and connectable from the rear of said hopper means back to the lawnmower handle for connecting said hopper means to the lawnmower handle, said drive wheels and said handle connectors being the only structural support and structural connections between said hopper means and the lawnmower.

9. The spreader attachment of claim 2, wherein there is further included separate handle locking accessory means for locking the lawnmower handle in position with respect to the rest of the lawn mower.

10. The spreader attachment of claim 2, wherein said hopper means comprises a hopper having a generally triangular, inverted configuration along its sides and a lateral width comparable to the lateral width of the lawnmower and being mountable above and forward of the lawnmower handle and directly above the rear wheels of the lawnmower.

11. The spreader attachment of claim 2, wherein said flow control means is a rotatable, mechanical agitator located in the bottom of said hopper means, said agitator being rotatable in conjunction with the rotation of said drive wheel means which in turn is rotatable in conjunction with the rotation of the lawnmower wheels.

*12. The spreader attachment of claim 2, wherein the attachment means also serves as a splash plate means extending behind the lower ends of said tubes for further distributing the fertilizer after it leaves said lower ends.*

* * * * *